United States Patent
Alexander et al.

(10) Patent No.: US 9,316,322 B2
(45) Date of Patent: Apr. 19, 2016

(54) SPLIT SEAT SHEAR VALVE

(75) Inventors: David James Alexander, Banchory (GB); Prabhu Palanisamy, Aberdeen (GB); Hussain Hashemizadeh, Aberdeenshire (GB)

(73) Assignee: Vetco Gray U.K. Limited, Houston, TX (US)

( * ) Notice: Subject to any disclaimer, the term of this patent is extended or adjusted under 35 U.S.C. 154(b) by 961 days.

(21) Appl. No.: 13/540,145

(22) Filed: Jul. 2, 2012

(65) Prior Publication Data

US 2014/0001390 A1   Jan. 2, 2014

(51) Int. Cl.
*E21B 33/06* (2006.01)
*F16K 3/02* (2006.01)

(52) U.S. Cl.
CPC ............. *F16K 3/0263* (2013.01); *E21B 33/063* (2013.01)

(58) Field of Classification Search
CPC .......... E21B 33/063; F16K 3/02; F16K 3/312
See application file for complete search history.

(56) References Cited

U.S. PATENT DOCUMENTS

| | | | | |
|---|---|---|---|---|
| 2,796,230 | A * | 6/1957 | Grove | F16K 3/0236 251/172 |
| 4,411,439 | A * | 10/1983 | Couvillion | F16J 15/166 277/558 |
| 4,625,942 | A * | 12/1986 | Nelson | F16K 3/0227 251/172 |
| 5,803,431 | A * | 9/1998 | Hoang | E21B 29/04 251/326 |
| 6,454,015 | B1 | 9/2002 | Armstrong et al. | |
| 6,929,244 | B1 | 8/2005 | Law et al. | |
| 7,325,783 | B2 | 2/2008 | Hunter | |
| 7,975,983 | B2 | 7/2011 | Comeaux et al. | |
| 8,070,131 | B2 | 12/2011 | Liew | |
| 2010/0319906 | A1 * | 12/2010 | Van Winkle | E21B 33/063 166/85.4 |

FOREIGN PATENT DOCUMENTS

EP     0416719 A1    3/1991
GB     2352494 A     1/2001

OTHER PUBLICATIONS

PCT Search Report and Written Opinion issued Jun. 26, 2014 in connection with corresponding PCT Patent Application No. PCT/GB2013/051736.

* cited by examiner

*Primary Examiner* — William P Neuder
(74) *Attorney, Agent, or Firm* — Bracewell LLP

(57) ABSTRACT

A gate valve has a gate valve seat for sealing a valve body to a gate of the gate valve. The valve seat extends from a flow passage of the valve body into a cavity of the valve body parallel to an axis of the flow passage. The cavity is perpendicular to the flow passage, and the gate is disposed within the cavity. The valve seat has a tubular body having a face for contact with a gate, and an end opposite the face adjacent to and in contact with the valve body. The valve seat also includes a sleeve positioned on an inner diameter of the tubular body, the sleeve adapted to receive a shear force for shearing a member extending through the flow passage, the inner sleeve having an adjustable length.

17 Claims, 5 Drawing Sheets

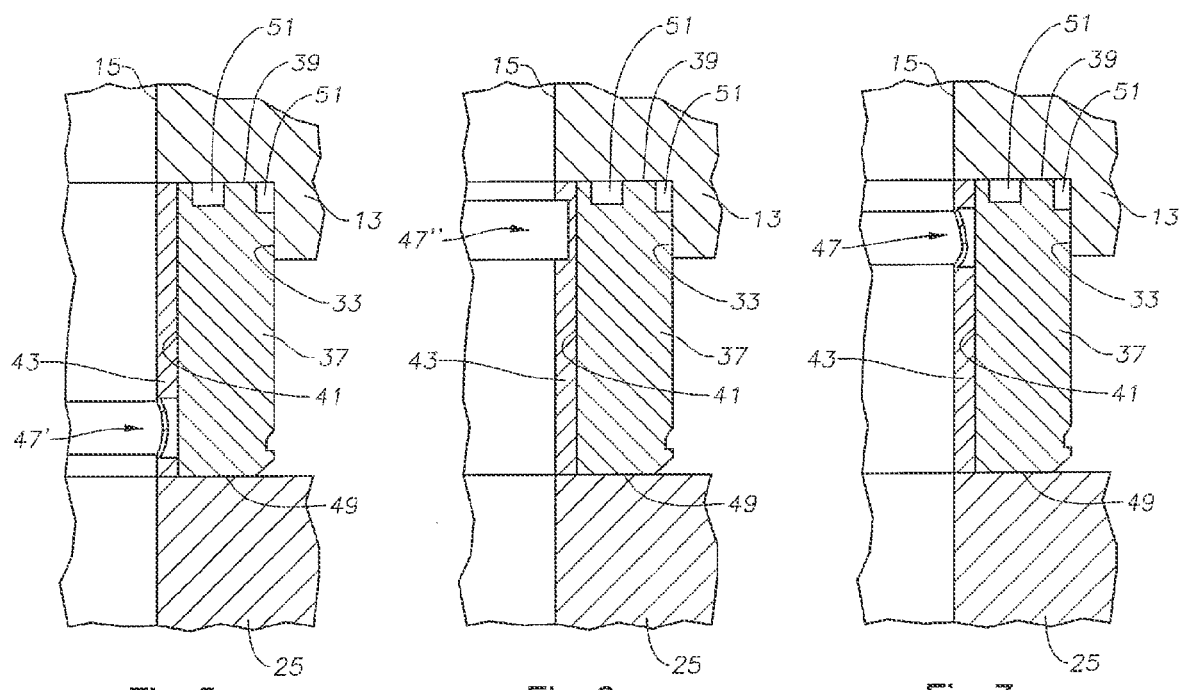

SPLIT SEAT SHEAR VALVE

BACKGROUND OF THE INVENTION

1. Field of the Invention

The present invention relates in general to slab style gate valves and, in particular, to a shear gate valve having a valve seat with a deformable inner sleeve.

2. Brief Description of Related Art

A production bore intervention valve may be used on a subsea oil and gas work over riser system. The work over riser system provides safe access to the production bore during well intervention activities. The intervention valve provides a means to control well bore fluids and also to allow the platform to disconnect from the well during an emergency situation. Closure of the valve may be required when downhole tooling such as coiled tubing or wireline are still running through the valve. The valve must be capable of severing the coiled tubing or wireline to allow the valve to close, while maintaining the valve's function as a fluid barrier.

A typical gate valve used in connection with oil and gas production has a body with a flow passage extending through it. The flow passage intersects a central cavity. Seat rings or seats are placed in counterbores formed in the flow passage at the intersection of the flow passage with the cavity. A gate will variably move through the central cavity. to block the flow passage. The seats bridge a gap between the valve body and the gate to prevent fluid from flowing around the gate when the gate blocks the flow passage.

The action of shearing any downhole tooling requires significant loads and very high localized stresses on the gates and seats involved. This stressing can lead to damage or general degradation of the surface finish on any of the sealing faces of the gates and seats adjacent to the edges where this shearing occurs. This surface damage to the sealing faces of the gate and the seat can cause sealing problems when the valve is closed, leading to leakage. Currently there are issues with the sealing of gate valves after shearing of coiled tubing, wireline, or a combination of both. As the movement of the gate presses the wireline or coiled tubing against the valve seat, the sealing faces of the valve seat adjacent the gate and interior of the valve may significantly deteriorate. A protective barrier may be placed between the seat and the wireline or coiled tubing to limit the damage to the seat; however, these barriers may become misaligned during operation and interfere with the seats ability to seal to the gate. Even seemingly minor damage to the surfaces of the gate and seats is enough to have an effect on the ability of the valve to seal. Therefore a valve seat with a protective barrier that does not inhibit or prevent sealing of the seat to the gate during use would be beneficial.

SUMMARY OF THE INVENTION

These and other problems are generally solved or circumvented, and technical advantages are generally achieved, by preferred embodiments of the present invention that provide a valve seat for shearing of a wireline or coiled tubing and a method for the same.

In accordance with an embodiment of the present invention, a gate valve seat for sealing a valve body to a gate Of a gate valve is disclosed. The gate valve has a flow passage with an axis. The flow passage intersects a cavity of a valve body of the gate valve. The valve seat is adapted to be positioned parallel to the axis of a flow passage. The valve seat includes tubular body having a face for contact with a gate and an end opposite the face adjacent to and in contact with the valve body. A sleeve is positioned on an inner diameter of the tubular body, the sleeve having an inner edge being flush with the face of the tubular body and being adapted to receive a shear force for shearing a member extending through the flow passage, the sleeve having a deformable section adapted to decrease the axial length of the inner sleeve in response to axial loading of the sleeve.

In accordance with another embodiment of the present invention, a gate valve is disclosed. The gate valve includes a valve body having a flow passage extending through a medial portion of the valve body and a cavity extending at least partially through a medial portion of the valve body perpendicular to the flow passage. The cavity intersects the flow passage. A gate is disposed within the cavity, the gate having a portion with an opening extending through the gate. The gate is moveable through the cavity to selectively align the opening with the flow passage to allow flow across the gate and align a solid portion of the gate with the flow passage to prevent flow across the gate. The gate valve includes a valve seat extending from the valve body into the cavity to seal to the gate and the valve body. The valve seat includes a tubular body having a face for contact with a gate and an end opposite the face adjacent to and in contact with the valve body. A sleeve is positioned on the inner diameter of the tubular body. The sleeve is adapted to receive a shear force for shearing a member extending through the flow passage and includes a deformable section adapted to decrease the axial length of the inner sleeve relative to the tubular body in response to axial loading of the sleeve. The inner sleeve has a cutting edge on its inner edge flush with the gate.

In accordance with yet another embodiment of the present invention, a method to maintain a seal between a gate valve seat and a gate of a gate valve is disclosed. The method provides a tubular body having a face for contact with a gate and an end opposite the face for sealing to the valve body. The method positions an inner sleeve on an inner diameter of the tubular body. The method operates the gate to block a flow passage of the gate valve and compresses a member passing through the valve across the gate against the sleeve to shear the member. The method seals the tubular body to the gate and axially decreases the length of the inner sleeve so that the seal is formed across the face of the tubular body in response to the shearing of the member generating debris deposited between an inner edge of the sleeve and the gate.

An advantage of the disclosed embodiments is that the disclosed embodiments provide an inner sleeve that protects the sealing surfaces of the valve seat during shearing of a member passed through the valve. In addition, the disclosed embodiments provide an inner sleeve that may be replaced after repeated uses without requiring replacement of the seat. Still further, the disclosed embodiments provide an inner sleeve that has sufficient hardness to act as a cutting surface for shear of a wireline or coiled tubing passed through the gate valve. The disclosed embodiments also provide an inner sleeve that is axially compressible so that in the event that debris is trapped between an end of the sleeve and the gate, the seat will still seal to the gate.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments.

FIG. 5 is a sectional view of the gate and an alternative valve seat in accordance with a third embodiment.

FIG. 6 is a sectional view of the gate and an alternative valve seat in accordance with a fourth embodiment.

FIG. 7 is a detail view of a portion of the valve gate and valve seat of FIG. 3 in accordance with a fifth embodiment.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

In the following discussion, numerous specific details are set forth to provide a thorough understanding of the present invention. However, it will be obvious to those skilled in the art that the present invention may be practiced without such specific details. Additionally, for the most part, details concerning valve construction, operation, use, and the like have been omitted inasmuch as such details are not considered necessary to obtain a complete understanding of the present invention, and are considered to be within the skills of persons skilled in the relevant art.

Figure 1:
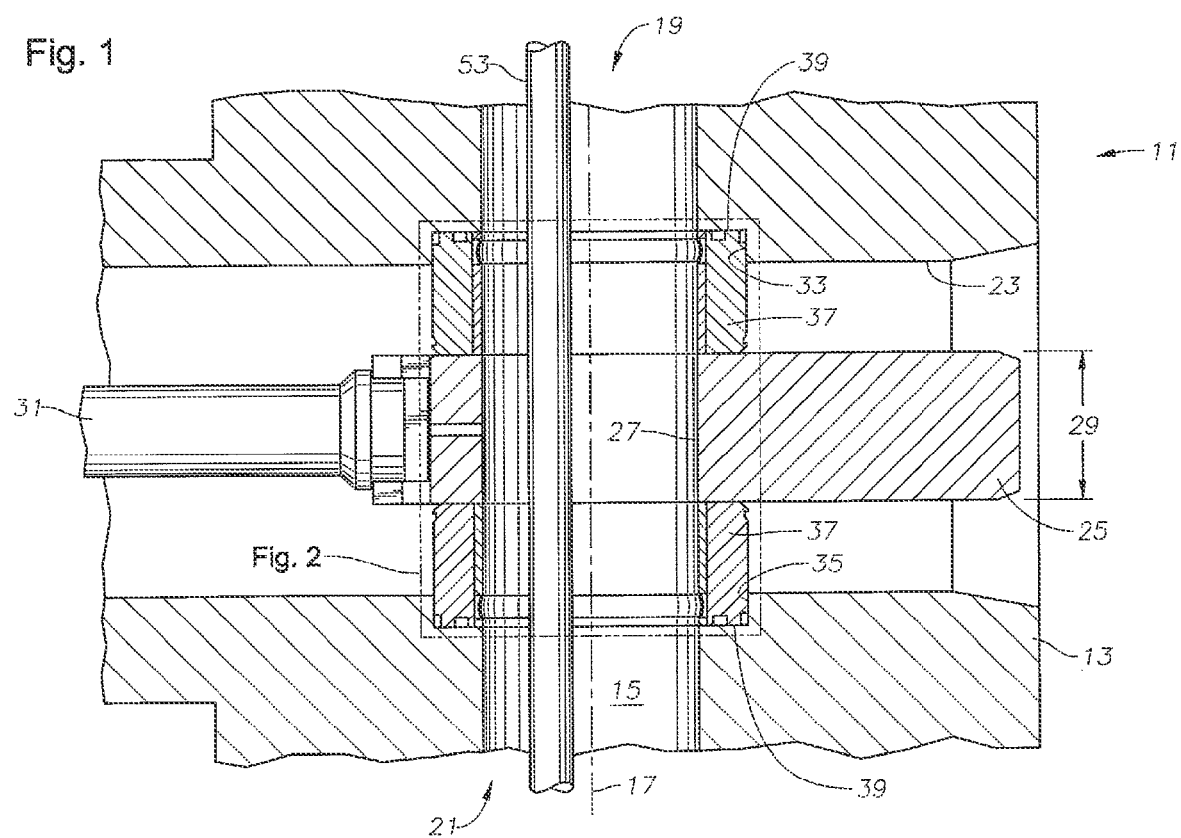
FIG. 1 is a sectional view of a shear gate valve having a gate in an open position in accordance with an embodiment.

Referring to FIG. 1, a section view of a gate valve 11 is shown. Gate valve 11 includes a valve body 13 having a central flow passage 15 formed therein. Flow passage 15 has an axis 17 and extends from an end 19 of body 13 to an end 21 of body 13 opposite end 19 so that fluid or gaseous substances may flow through valve body 13 within flow passage 15. Valve body 13 also includes a central cavity 23 extending through a medial portion of valve body 13 perpendicular to flow passage 15. A gate 25 is positioned near a medial portion of cavity 23. Gate 25 includes a gate opening 27 extending through gate 25. Gate opening 27 has a diameter substantially equivalent to a diameter of flow passage 15 so that gate opening 27 may be aligned with flow passage 15 to allow fluid or gaseous substances to pass through gate 25. In the illustrated embodiment, gate 25 has a thickness 29 less than a diameter or thickness of cavity 23 so that gate 25 may travel through cavity 23 perpendicular to axis 17. A person skilled in the art will understand that gate 25 may be designed in one or two pieces. A valve stem 31 couples to gate 25 and is operable to move gate 25 perpendicular to axis 17. Valve stem 31 may be a rising stem type or a non-rising stein type as desired for the particular application of valve 11. A person skilled in the art will recognize that a packing assembly (not shown) may seal valve stem 31 to valve body 13. A handle (not shown) may couple to valve stem 31 for rotation of valve stem 31. In other exemplary embodiments, an electrical, hydraulic, or pneumatic actuation device (not shown) may couple to valve stem 31 for rotation of valve stem 31. Rotation of valve stem 31 may cause movement of gate 25 perpendicular to axis 17 to selectively allow flow through flow passage 15 as shown in FIG. 1 or block flow passage 15 as shown in FIG. 3.

As shown in FIG. 1, flow passage 15 is counterbored where flow passage 15 intersects cavity 23. A person skilled in the art will recognize that flow passage 15 includes a pair of counterbores 33, 35 formed on opposite sides of cavity 23 where flow passage 15 intersects cavity 23. A valve seat ring or valve seat 37 extends from valve, body 13 to gate 25 across cavity 23. In an exemplary embodiment, each valve seat 37 has a respective end 39 seated in a respective counterbore 33, 35. Valve seats 37 seal to valve body 13 at counterbores 33, 35 and to gate 25 as described in more detail below.

Figure 2:
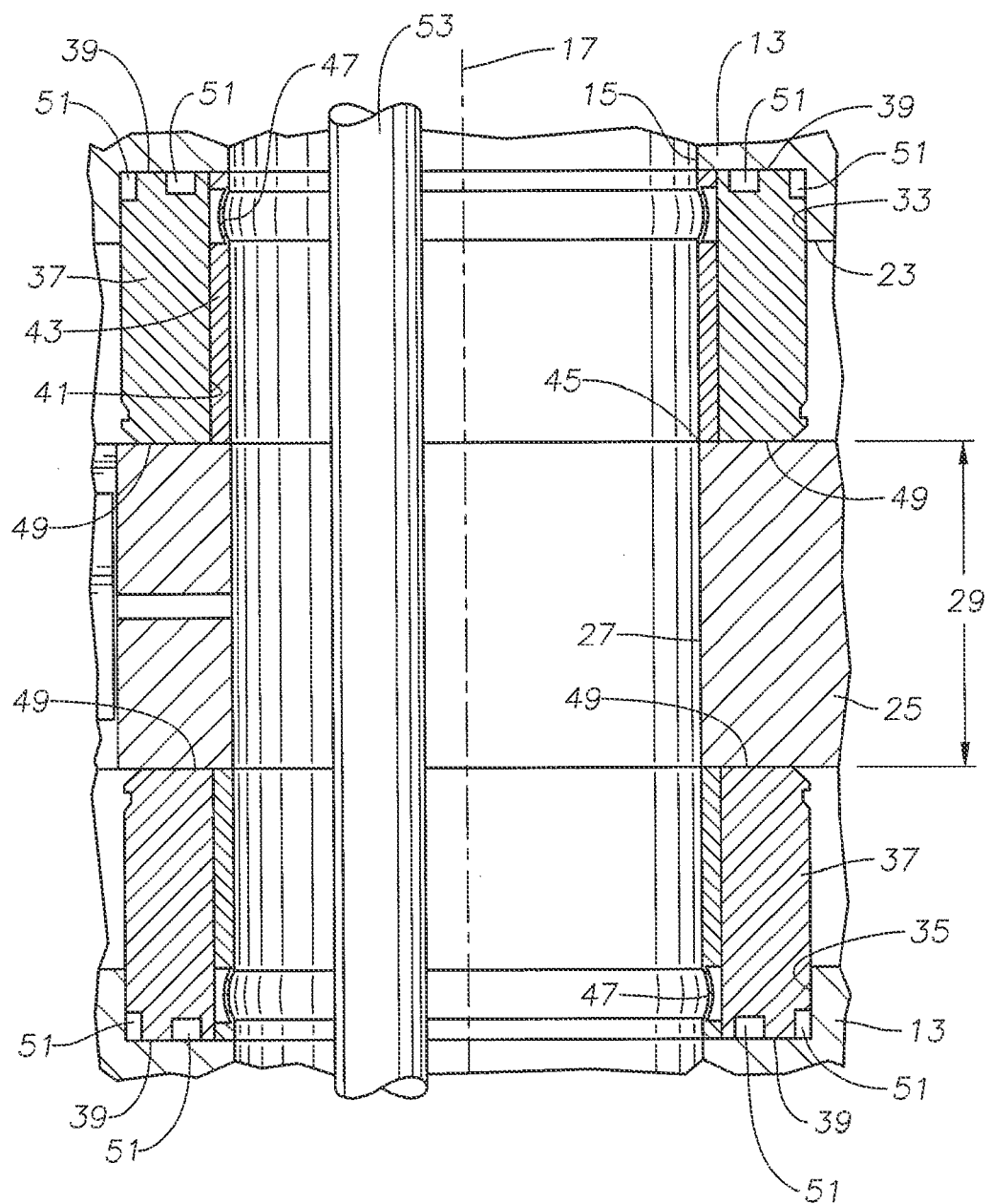
FIG. 2 is a detail view of a portion of the valve gate and valve seats in accordance with the embodiment of FIG. 1.

Referring to FIG. 2, valve seat 37 has an inner diameter surface 41 larger than the diameter of flow passage 15 so that when Valve seat 37 is coaxial with flow passage 15, inner diameter surface 41 of valve seat 37 will be recessed from the surface of flow passage 15. The recess may be an annular recess that extends the length of seat 37. An inner sleeve 43 may be positioned adjacent inner diameter surface 41 within this recess. Inner sleeve 43 will have a thickness from its inner diameter surface to its outer diameter surface such that when inner sleeve 43 is coaxial with valve seat 37 and flow passage 15, an outer diameter surface of inner sleeve 43 may contact inner diameter surface 41, and an inner diameter surface of sleeve 43 may be flush with flow passage 15 and gate opening 27 as shown in FIG. 2. In the illustrated embodiment, inner sleeve 43 has a length equivalent to a length of seat 37 so that an inner edge of inner sleeve 43 is flush with a sealing surface 49, described below of seat 37. In an alternative embodiment, inner sleeve 43 may have a length slightly longer than the length of seat 37. In these embodiments, when inner sleeve 43 is positioned between gate 25 and valve body 13, deformable section 47 may be slightly compressed, allowing deformable section 47 to act as a slight spring. A person skilled in the art will recognize that in these alternative embodiments, the difference in lengths is slight and sealing will continue to occur between valve seat 37 and gate 25 as described herein.

Figure 3:
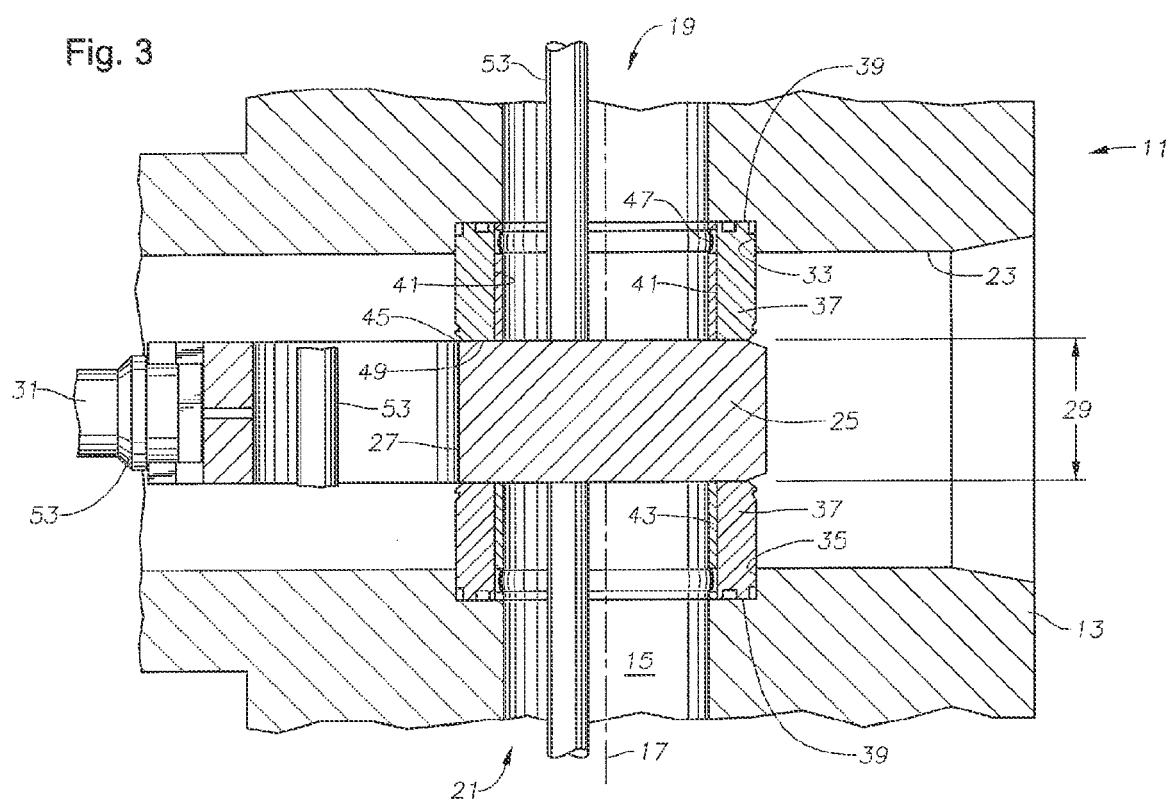
FIG. 3 is a sectional view of the shear gate valve of FIG. 1 having the gate moved to a closed position in accordance with the embodiment of FIG. 1.

Each seat 37 includes sealing surface 49 adjacent to and in sealing contact with gate 25 when gate 25 is closed (FIG. 3). In the illustrated embodiment, sealing surface 49 is perpendicular to axis 17. Each seat 37 may include one or more recesses 51 formed on end 39 opposite sealing surface 49. Each recess 51 may have a seal (not shown), such as an elastomeric O-ring or other seal type, mounted therein to seal each seat 37 to the respective counterbores 33, 35. The seal or sealing element provides a seal and thus prevents the flow of fluid into cavity 23. This is the case when the seal and seat 37 are on the downstream side of valve 11.

Figure 4:
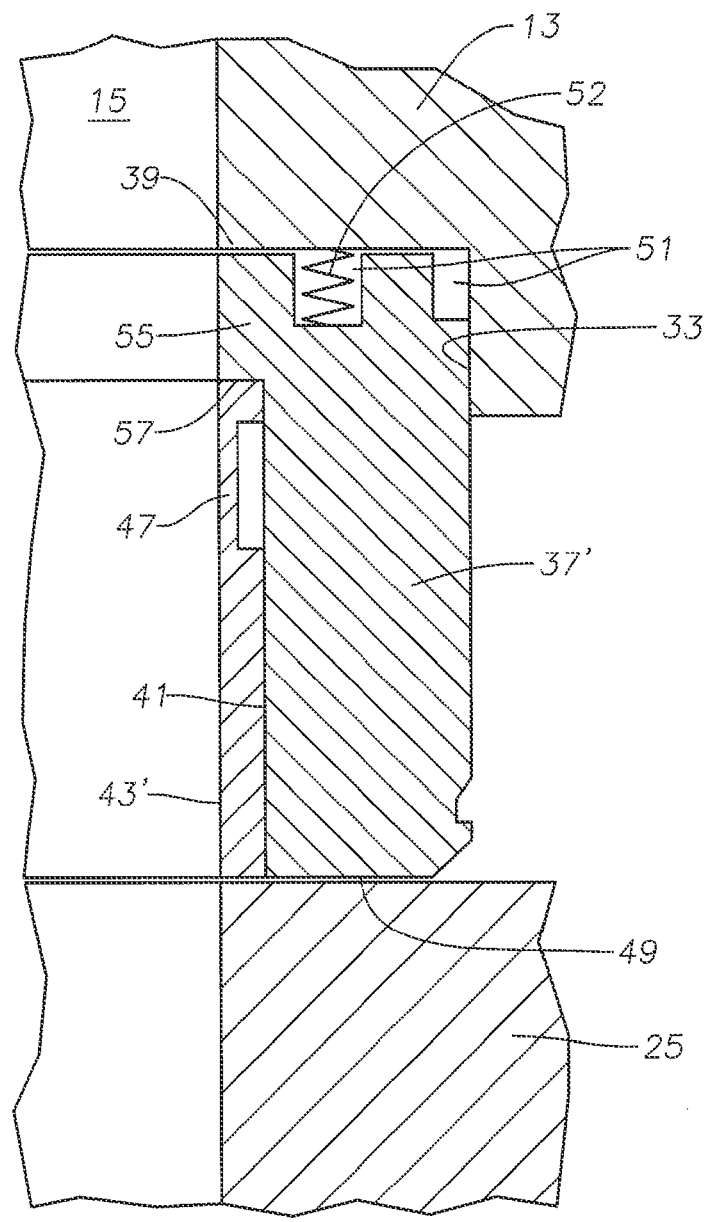
FIG. 4 is a sectional view of the gate and an alternative valve seat in accordance with a second embodiment.

In some exemplary embodiments, such as those illustrated in FIG. 4, a spring element 52 is also located in counterbores 33, 35. The spring element pushes seats 37 against gate 25 from whichever side gate 25 is loaded. When gate 25 is closed, the downstream or low pressure side seat 37 will be urged against gate 25 by the spring element to prevent fluid from cavity 23 entering flow passage 15 on the downstream side. The sealing element and spring element are located within the one or more recesses 51 formed on seats 37. Additionally, a sand screen (not shown) may be used to prevent debris from entering between seats 37 and valve body 13. In exemplary embodiments where a spring element 52 is also located in counterbores 33, 35, a valve seat 37' may include an inwardly extending portion 55 located proximate to end 39 of valve seat 37' as shown in FIG. 4. Inwardly extending portion 55 may have an inner diameter less than the inner diameter surface 41 so that inwardly extending portion 55 defines a gate facing shoulder 57. An inner sleeve 43' may have an axial length such that inner sleeve 43' extends from gate facing shoulder 57 to sealing surface 49 of valve seat 37'. Inner sleeve 43' will include the components of and operate as inner sleeve 43 modified to float with valve seat 37'.

In the embodiments illustrated in FIG. 2, gate valve 11 is a shear valve. During use of valve 11, wireline or coiled tubing 53 may be passed through flow passage 15 from end 19 to end 21 across gate 25 through gate opening 27. In the event that flow passage 15 must be blocked, stem 31 may be operated to move gate 25 through cavity 23 to block flow passage 15 as shown in FIG. 3. If wireline or coiled tubing is disposed within valve 11, an edge 45 of opening 27 will compress the wireline or coiled tubing against inner sleeve 43 causing gate 25 to shear the wireline or coiled tubing 53, severing the wireline or coiled tubing 53 and allowing gate 25 to block flow passage 15.

During operation of shear gate valve 11, inner sleeve 43 provides the interface for cutting or shearing of coiled tubing 53, wireline, or a combination of both that may have been passed through flow passage 15. Inner sleeve 43 may not seal but may provide the cutting surface for wireline or coiled tubing 53 in flow passage 15. Controlled loading will be applied with gate 25 to maintain an even contact pressure between edge 45, wireline or coiled tubing 53, and inner sleeve 43. The controlled load is required in order to maintain an even contact pressure and prevent the formation of a gap between inner sleeve 43 and gate 25. It is desirable to prevent this gap from forming in order to provide a clean cutting interface and prevent the ingress of debris.

In one example of use of the device described herein, wireline or coiled tubing 53 passes through an embodiment of valve 11 while valve 11 is in an open or partially open position (FIG. 1). A circumstance may arise requiring valve 11 to be put into a closed position (FIG. 3) before wireline or coiled tubing 53 can be removed from valve 11. Gate 25 of valve 11, having cutting edge 45, is then selectively moved from the open position (FIG. 1) to the closed position (FIG. 3). Gate 25 is closed with sufficient force to sever wireline 53 when cutting edge 45 impinges it against the inner diameter of inner sleeve 43. When in the closed position, the valve face of gate 25 seals against sealing surfaces 49 of valve seats 37, without cuttings trapped between the face of gate 25 and valve body 13 or valve seats 37. Shear loading is principally applied to the edge of inner sleeve 43 adjacent gate 25. As inner sleeve 43 extends the entire length and circumference of seat 37, damage that may normally occur to seat 37 during the shearing process instead occurs to inner sleeve 43. In this manner, inner sleeve 43 operates as a protective barrier for valve seat 37, preventing damage to seat 37 so that seat 37 may continue to seal to gate 25 and valve body 13.

Debris from shearing of wireline or coiled tubing 53 may also lodge between an end of inner sleeve 43 and the face of gate 25. In the illustrated embodiment, the inner sleeve 43 includes a deformable section 47 that permits inner sleeve 43 to partially collapse along axis 17. In the illustrated embodiment, deformable section 47 may be a groove machined, forged, cast, or otherwise formed in an outer diameter of inner sleeve 43. As shown, deformable section 47 may be located proximate to an end of inner sleeve 43 adjacent valve body 13. In other embodiments, a deformable section 47 may be formed proximate an end of inner sleeve 43 adjacent gate 25 as shown in FIG. 5. In still other embodiments, a deformable section 47" may be formed on the inner diameter Of inner sleeve 43 as shown in FIG. 6. In still other embodiments, deformable section 47 may include more than one machined groove or may include more than one machined groove on alternating inner and outer diameter surfaces of inner sleeve 43. In yet other embodiments, deformable section 47 may have a bellows shape, permitting deformable section 47 to act as a slight spring. At deformable section 47, inner sleeve 43 has a decreased thickness; thus, when subjected to axial loading, deformable section 47 may not have the same axial compressive strength as the remainder of inner sleeve 43. This permits inner sleeve 43 to have its axial length reduced under axial loading. In the illustrated embodiments, the deformation of deformable section 47 is elastic, allowing continued use of inner sleeve 43 without requiring replacement after a shearing event.

As shown in FIG. 7, in the event that debris is lodged between gate 25 and inner sleeve 43, inner sleeve 43 will deform to decrease the axial length of inner sleeve 43 so that face 39 of seat 37 maintains full contact with the face of gate 25. In this manner, the pressure differences across gate 25 when closed will primarily load valve seat 37 so that valve seat 37 will remain sealed to gate 25 and valve body 13. Inner sleeve 43 may be formed of any suitable material and may have a hardness comparable to the hardness of gate 25 or a coating on gate 25. In an exemplary embodiment, gate 25 is coated in tungsten carbide, although a person skilled in the art will understand that other materials having similar hardnesses may be used. In an exemplary embodiment, inner sleeve 43 is entirely coated in tungsten carbide. In other exemplary embodiments, only a portion of inner sleeve 43, such as the end proximate to gate 25 is coated in tungsten carbide. In an exemplary embodiment, inner sleeve 43 is sufficiently hard to resist deformation by shear loading during shearing of wireline or coiled tubing 53. In another exemplary embodiment, an end of the inner diameter end of inner sleeve 43 may be bonded or otherwise affixed to seat 37, for example between deformable section 47 and the end of inner sleeve 43 adjacent valve body 13.

Accordingly, the disclosed embodiments provide numerous advantages. For example, the disclosed embodiments provide an inner sleeve that protects the sealing surfaces of the valve seat during shearing of a member passed through the valve. In addition, the disclosed embodiments provide an inner sleeve that may be replaced after repeated uses without requiring replacement of the seat. Still further, the disclosed embodiments provide an inner sleeve that has sufficient hardness to act as a cutting surface for shear of a wireline or coiled tubing passed through the gate valve. The disclosed embodiments also provide an inner sleeve that is axially compressible so that in the event that debris is trapped between an end of the sleeve and the gate, the seat will still seal to the gate.

It is understood that the present invention may take many forms and embodiments. Accordingly, several variations may be made in the foregoing without departing from the spirit or scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A gate valve, comprising:
   a valve body having a flow passage with an axis, the flow passage intersecting a cavity in the valve body;
   a gate movable through the cavity to selectively open and close the flow passage
   a valve seat positioned parallel to the axis of the flow passage, the valve seat comprising:
   a tubular body having an annular face contacted by the gate and an end opposite the face in engagement with the valve body; and
   a sleeve positioned on an inner diameter of the tubular body, the sleeve having an inner edge flush with the face of the tubular body, the sleeve adapted to receive a shear force for shearing a member extending through the flow passage, the sleeve having a deformable section with less axial compressive strength than a remaining portion of the sleeve that is configured to decrease an axial length of the sleeve in response to axial loading of the sleeve by contact with the gate while the gate is shearing the member.

2. The gate valve of claim 1, wherein the deformable section elastically biases the inner edge of the sleeve against the gate.

3. The gate valve of claim 1, wherein the deformable section is located proximate to the face of the tubular body.

4. The gate valve of claim 1, wherein the deformable section comprises a portion of the sleeve having an outer diameter less than an outer diameter of the remaining portion of the sleeve.

5. The gate valve of claim 1, wherein the deformable section comprises a portion of the sleeve having an inner diameter greater than an inner diameter of the remaining portion of the sleeve.

6. The gate valve seat of claim 1, wherein the deformable portion elastically deflects while the gate is shearing the member.

7. The gate valve of claim 1, wherein a portion of the sleeve proximate to the face of the tubular body has a tungsten carbide coating.

8. A gate valve comprising:
   a valve body having a flow passage extending through a medial portion of the valve body and a cavity extending at least partially through a medial portion of the valve body perpendicular to the flow passage, the cavity intersecting the flow passage;
   a gate disposed within the cavity, the gate having a portion with an opening extending through the gate, the gate moveable through the cavity to selectively align the opening with the flow passage to allow flow across the gate and align a solid portion of the gate with the flow passage to prevent flow across the gate; and
   a valve seat extending from the valve body into the cavity to seal to the gate and the valve body, the valve seat comprising:
   a tubular body having an annular face in contact with the gate and an end opposite the face adjacent to and in engagement with the valve body; and
   a sleeve positioned on the inner diameter of the tubular body, the sleeve having an inner edge that is in contact with the gate and flush with the face of the tubular body, the sleeve adapted to receive a shear force for shearing a member extending through the flow passage, the sleeve having a deformable section with less axial compressive strength than a remaining portion of the sleeve and is configured to decrease an axial length of the inner sleeve relative to the tubular body in response to axial loading of the sleeve by contact with the gate while the gate is shearing the member, the sleeve having a cutting edge on its inner edge flush with the face of the valve seat.

9. The gate valve of claim 8, wherein the axial length of the sleeve is the same as an axial length of the tubular body.

10. The gate valve of claim 8, wherein the sleeve has an inner diameter substantially the same as an inner diameter of the flow passage and smaller than any portion of an inner diameter of the tubular body.

11. The gate valve of claim 8, wherein the deformable section is configured to cause the axial length of the sleeve to elastically deflect while the gate is shearing the member.

12. The gate valve of claim 8, wherein the deformable section has an outer diameter less than an outer diameter of the sleeve.

13. The gate valve of claim 8, wherein the deformable section has an inner diameter greater than inner diameter of the remaining portion of the inner sleeve.

14. The gate valve of claim 8, wherein the deformable section elastically biases the inner edge of the sleeve against the gate.

15. The gate valve of claim 8, wherein a portion of the sleeve proximate to the face of the tubular body has a tungsten carbide coating.

16. A method to shear a member with a gate of a gate valve, the method comprising:
   (a) providing a tubular body having an annular face for contact with a gate and an end opposite the face for sealing to a valve body;
   (b) positioning an inner sleeve on an inner diameter of the tubular body;
   (c) operating the gate to block a flow passage of the gate valve, causing a portion of the gate to slide across the face of the tubular body and the inner edge of the inner sleeve;
   (d) while performing step (c), shearing a member passing through the valve with the gate and the inner edge of the sleeve; and
   (e) in the event debris from the member being sheared deposits between the inner edge of the inner sleeve and the gate, axially decreasing the length of the inner sleeve in response to the movement of the gate so that a sealing engagement is maintained between the face of the tubular body and the gate.

17. The method of claim 16, wherein step (e) comprises axially deforming a deformable section of the inner sleeve to decrease the axial length of the inner sleeve.

* * * * *